United States Patent
Bohlin et al.

(10) Patent No.: US 7,242,587 B2
(45) Date of Patent: *Jul. 10, 2007

(54) BULKHEAD MOUNTABLE OPTOELECTRONIC DEVICE

(75) Inventors: John Bohlin, Palm Bay, FL (US); Robert Scharf, Melbourne, FL (US)

(73) Assignee: Stratos International, Inc., Chicago, IL (US)

( * ) Notice: Subject to any disclaimer, the term of this patent is extended or adjusted under 35 U.S.C. 154(b) by 12 days.

This patent is subject to a terminal disclaimer.

(21) Appl. No.: 11/083,568

(22) Filed: Mar. 18, 2005

(65) Prior Publication Data

US 2005/0163436 A1    Jul. 28, 2005

Related U.S. Application Data (63) Continuation of application No. 10/636,083, filed on Aug. 7, 2003, now Pat. No. 6,913,402.

(51) Int. Cl.
*H05K 7/00* (2006.01)

(52) U.S. Cl. .......................... 361/728; 361/730; 385/93

(58) Field of Classification Search ............... 350/96.2, 350/227, 96.15–96.17; 357/17, 30, 72; 361/747, 361/759, 732, 740; 439/312, 559
See application file for complete search history.

(56) References Cited

U.S. PATENT DOCUMENTS

| 4,140,367 | A |   | 2/1979  | Makuch et al. ........... 350/96.22 |
| 4,249,057 | A | * | 2/1981  | Schlegel et al. ............ 200/296 |
| 4,273,413 | A | * | 6/1981  | Bendiksen et al. ........... 385/88 |
| 4,884,861 | A |   | 12/1989 | Nodfelt .......................... 350/96 |
| 5,039,194 | A | * | 8/1991  | Block et al. ................... 385/88 |
| 5,117,476 | A | * | 5/1992  | Yingst et al. .................. 385/88 |
| 5,157,749 | A | * | 10/1992 | Briggs et al. ................. 385/60 |
| 5,202,943 | A | * | 4/1993  | Carden et al. ................ 385/92 |
| 5,247,595 | A |   | 9/1993  | Foldi ............................ 385/78 |
| 5,274,729 | A | * | 12/1993 | King et al. .................. 385/134 |
| 5,283,802 | A |   | 2/1994  | Hsiung ....................... 372/107 |
| 5,337,398 | A | * | 8/1994  | Benzoni et al. ............... 385/90 |
| 5,416,871 | A | * | 5/1995  | Takahashi et al. ............ 385/88 |
| 5,528,408 | A | * | 6/1996  | McGinley et al. .......... 398/139 |
| 5,546,281 | A |   | 8/1996  | Poplawski et al. .......... 361/752 |
| 5,618,204 | A | * | 4/1997  | Nix et al. .................... 439/559 |
| 5,966,487 | A | * | 10/1999 | Gilliland et al. .............. 385/92 |
| 6,234,683 | B1 * | 5/2001  | Waldron et al. .............. 385/78 |
| 6,334,012 | B1 |   | 12/2001 | Yoon et al. .................... 385/24 |
| 6,350,063 | B1 * | 2/2002  | Gilliland et al. .............. 385/88 |
| 6,499,890 | B2 |   | 12/2002 | Gilliland et al. .............. 385/88 |
| 6,776,638 | B2 * | 8/2004  | Thurston .................... 439/312 |
| 6,913,402 | B2 * | 7/2005  | Bohlin et al. ................. 385/93 |

\* cited by examiner

*Primary Examiner*—Tuan T Dinh
(74) *Attorney, Agent, or Firm*—Karl D. Kovach (57) ABSTRACT

The optoelectronic device includes a sleeve, an insert body, a ferrule, a lens, an optical subassembly, an electrical connector, a substrate, a cover, and a panel nut. The sleeve includes seating surface, an aperture, and thread form. The panel nut has a thread form, and a seating surface. The thread form of the panel nut is complimentary to the thread form of the sleeve so that the panel nut is removeably mountable on the sleeve. In a mounted position, the thread form of the panel nut fully engages the thread form of the sleeve so that the seating surface of the of the panel nut contacts a first one surface of a bulkhead and the seating surface of the sleeve contacts another surface of the bulkhead so that the device is securely mounted to the bulkhead.

8 Claims, 10 Drawing Sheets

BULKHEAD MOUNTABLE OPTOELECTRONIC DEVICE

This is a continuation of U.S. patent application Ser. No. 10/636,083, now U.S. Pat. No. 6,913,402, filed Aug. 7, 2003, which is hereby incorporated herein by reference.

BACKGROUND OF THE INVENTION

1. Field of the Invention

The present invention pertains to optoelectronic devices. The invention more particularly concerns an optoelectronic device that is mountable to a bulkhead.

2. Discussion of the Background

An optoelectronic device utilizes at least one optical subassembly. The optical subassembly can be an optoelectronic receiver or an optoelectronic transmitter. An optoelectronic transmitter receives electrical signals, converts the electrical signals to light signals, and then transmits the light signals. An optoelectronic receiver receives light signals, converts the light signals to electrical signals, and then transmits the electrical signals. A transceiver is an optoelectronic device which has at least one optoelectronic receiver and at least one otpoelectronic transmitter.

In order to pass optical signals through a bulkhead, an optical bulkhead connector is employed. The optical bulkhead connector employs, in this example, two channels. Two discrete optical fibers define the two channels. One end of the optical bulkhead connector conforms to an expanded beam interface and the other ends of the two optical fibers conform to an LC standard interface. The optical bulkhead connector is attached to the bulkhead of the device of interest, such as a tank, so that the expanded beam portion of the connector is exposed to the ambient environment, and the LC portion of the connector is exposed to the interior of the vehicle. The Expanded beam portion of the device is attached to the bulkhead. The optical fibers may run some distance before the LC connectors are plugged into LC receptacles of an optoelectronic device, such as a transceiver, mounted elsewhere within the interior of the vehicle. Examples of expanded beam devices are set forth in U.S. Pat. Nos. 4,884,861, and 5,247,595. An example of an optical bulkhead connector is set forth in FIG. 15 of U.S. Pat. No. 6,234,683. Examples of optoelectronic devices are set forth in U.S. Pat. Nos. 5,528,408; 5,546,281; 6,350,063; and 6,499,890. U.S. Pat. Nos. 4,884,861; 5,247,595; 5,528,408; 5,546,281; 6,234,683; 6,350,063; and 6,499,890 are hereby incorporated herein by reference.

Some of the following qualities are paramount during the design phase of a successful military vehicle: the maximization of useable interior space, the reduction of weight, and the increased reliability of components that are used to construct the vehicle. Furthermore, such goals must be met while operating within a limited financial budget.

SUMMARY OF THE INVENTION

It is an object of the invention to provide an optoelectronic device which is mountable to a bulkhead.

It is a further object of the invention to provide an optoelectronic device having a reduced size as compared to known combinations of an optoelectronic device, a bulkhead connector, and the associated lengths of optical fibers and use of optical connectors and adapters so as to combine the separate piece parts.

It is another object of the invention to provide an optoelectronic device having a reduced weight as compared to known combinations of an optoelectronic device, a bulkhead connector, and the associated lengths of optical fibers and use of optical connectors and adapters so as to combine the separate piece parts.

It is still another object of the invention to provide an optoelectronic device having increased reliability as compared to known combinations of an optoelectronic device, a bulkhead connector, and the associated lengths of optical fibers and use of optical connectors and adapters so as to combine the separate piece parts.

It is still yet another object of the invention to provide an optoelectronic device having a unit cost that does not exceed the cost of designing and manufacturing the known combination of an optoelectronic device, a bulkhead connector, and the associated lengths of optical fibers and use of optical connectors and adapters so as to combine the separate piece parts.

It is yet still another object of the invention to provide an optoelectronic device which is easier to install in a vehicle than it is to install in a vehicle the known combination of an optoelectronic device, a bulkhead connector, and the associated lengths of optical fibers and use of optical connectors and adapters so as to combine the separate piece parts.

In one form of the invention the device includes a sleeve, an optical subassembly, an electrical connector, a substrate, and a panel nut. The sleeve includes seating surface. The substrate is attached to the optical subassembly and to the electrical connector. Mounted on the substrate are electrical signal conditioning components. The electrical signal conditioning components electrically connect the optical subassembly to the electrical connector. The panel nut has a seating surface. The panel nut is removeably mountable on the sleeve. In a mounted position, the seating surface of the of the panel nut contacts a first surface of a bulkhead and the seating surface of the sleeve contacts a second surface of the bulkhead so that the device is securely mounted to the bulkhead.

In another form of the invention, the device contains the features described above and further includes the features of a thread form on the sleeve, and a complementary thread form on the panel nut.

In another form of the invention, the device contains the features described above and further includes the features of the optical subassembly being a transmitting device.

Thus, the invention achieves the objectives set forth above. The invention provides an optoelectronic device which is mountable to a bulkhead, and is compact. Furthermore, as compared to the known art, the invention is easy to install, light in weight, economical to manufacture, and has increased reliability.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENT

Referring now to the drawings, wherein like reference numerals designate identical or corresponding parts throughout the several views, and more particularly to FIGS. 1-3 and 5-11 thereof, an embodiment of the present invention is a device or optoelectronic device 10 which is displayed therein.

Figure 1:
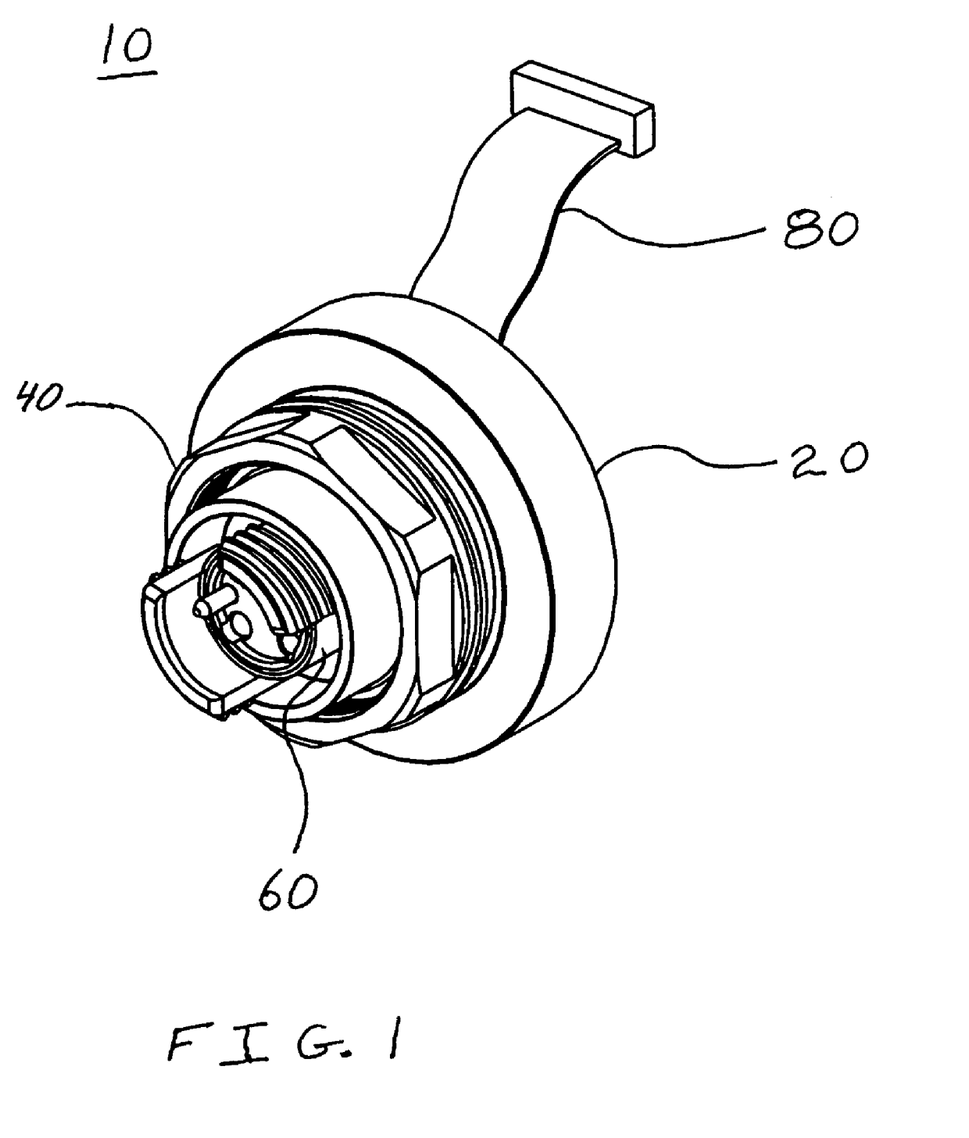
FIG. 1 is a perspective view of the optoelectronic device of the invention.

FIG. 1 is a perspective view of the optoelectronic device 10. The optoelectronic device 10, as shown in FIG. 1, includes sleeve 20, a panel nut 40, and an insert body 60. Also shown in FIG. 1 is a ribbon cable 80. The insert body 60 is insertable into an aperture 28 (see FIG. 10) of the sleeve 20. The panel nut 40 is mounted on the sleeve 20 via threaded surfaces. The ribbon cable 80 is attachable to an electrical connector or header 89 (see FIG. 3) of the optoelectronic device 10. The free end of the ribbon cable 80 is adapted to attach to another electrical connector, such as may be located on a remotely located and secured mother board, so that electrical power can flow to the optical subassemblies and so that electrical signals can flow to and from the optoelectronic device 10.

Figure 2:
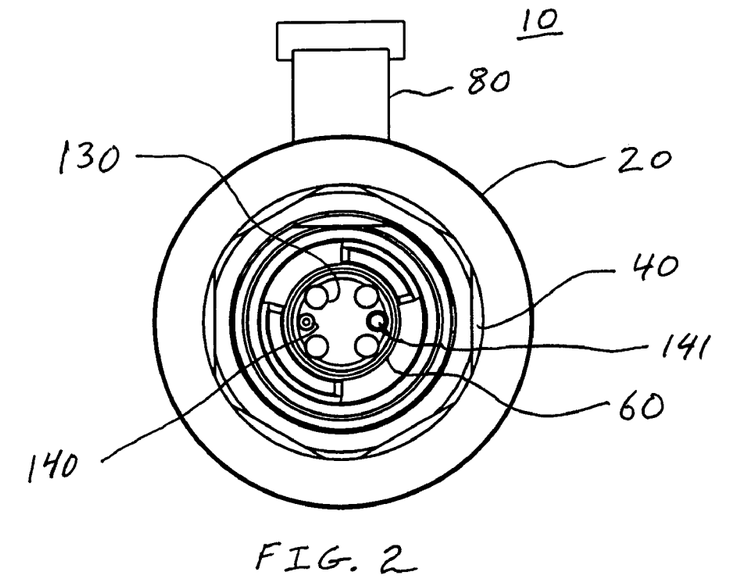
FIG. 2 is a front view of the optoelectronic device of FIG. 1.

FIG. 2 is a front view of the optoelectronic device 10 of FIG. 1. More clearly shown are four ball lenses, of which one ball lens is identified by numeral designator 130, an alignment pin 140, and an alignment pin hole 141. The ball lenses 130 and the alignment pin 140 are mounted in the insert body 60. The ball lenses 130 are positioned in respective ferrule receiving bores 62 (see FIG. 11). The alignment pin hole 141 is a feature formed into the material of the insert body 60.

Figure 3:
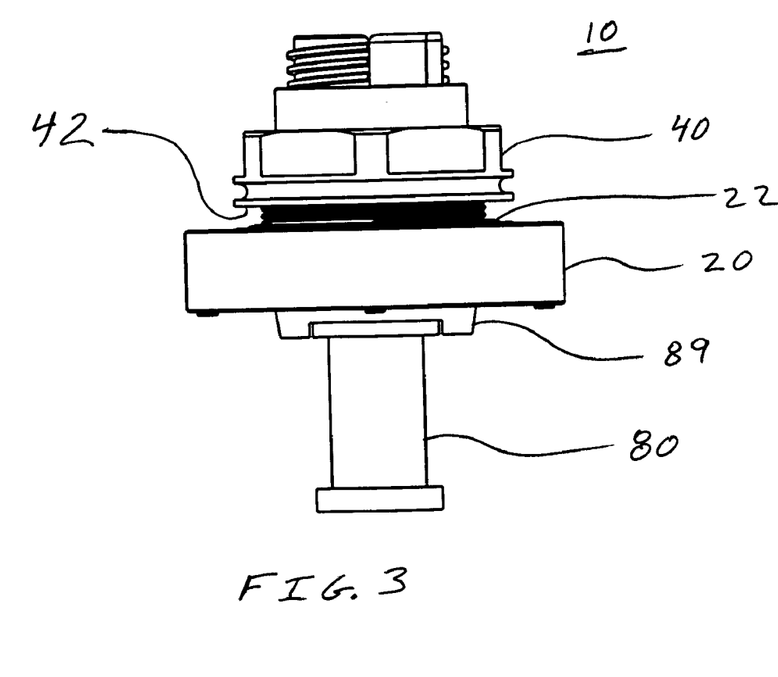
FIG. 3 is a side view of the optoelectronic device of FIG. 1.

FIG. 3 is a side view of the optoelectronic device 10 of FIG. 1. Shown in FIG. 2 are a seating surface 22 of the sleeve 20 and a seating surface 42 of the panel nut 40. The electrical connector 89 is shown projecting from the sleeve 20 and attaching to the ribbon cable 80.

Figure 4:
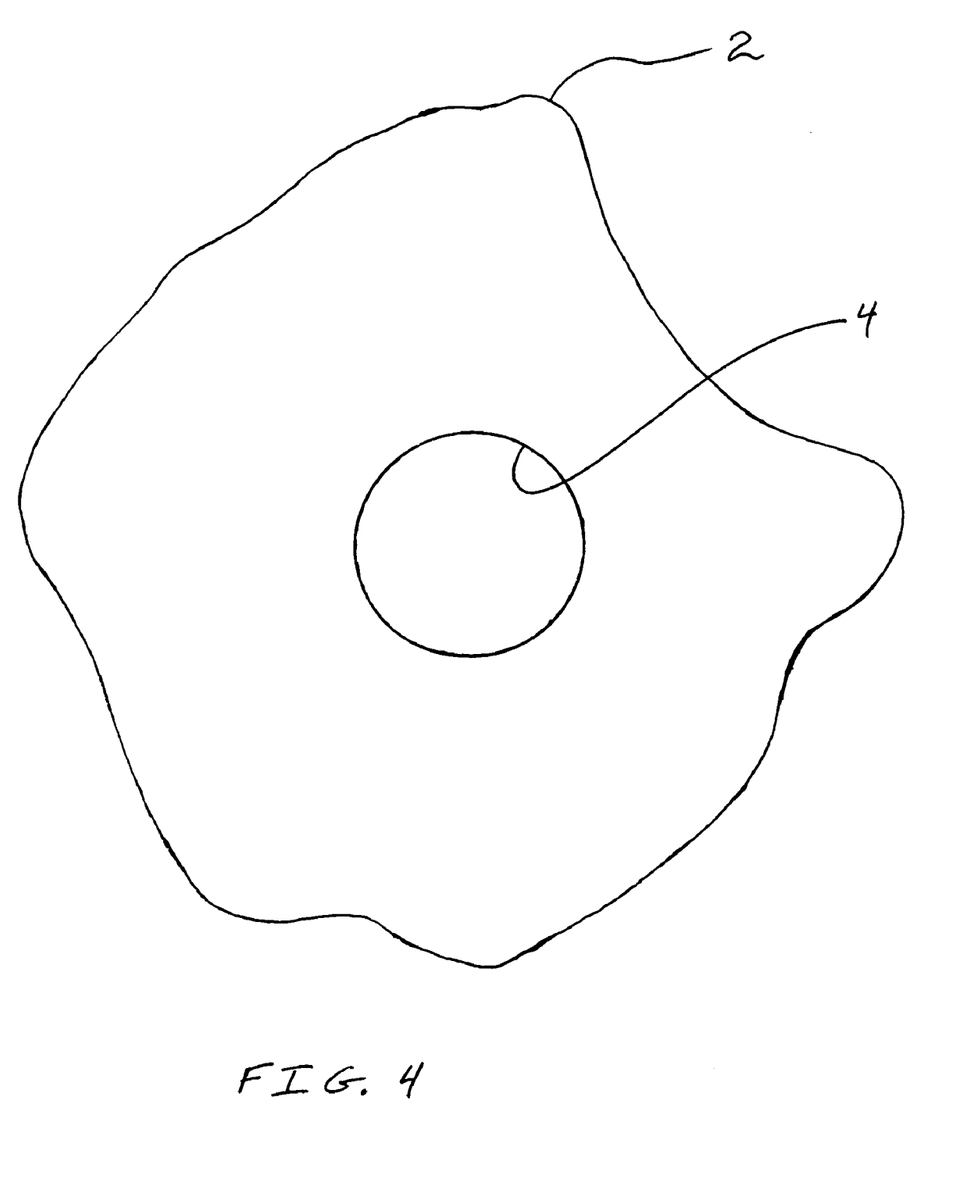
FIG. 4 is a plan view of a section of a bulkhead.

FIG. 4 is a plan view of a portion of the bulkhead 2. The bulkhead 2 is shown having an opening 4.

Figure 5:
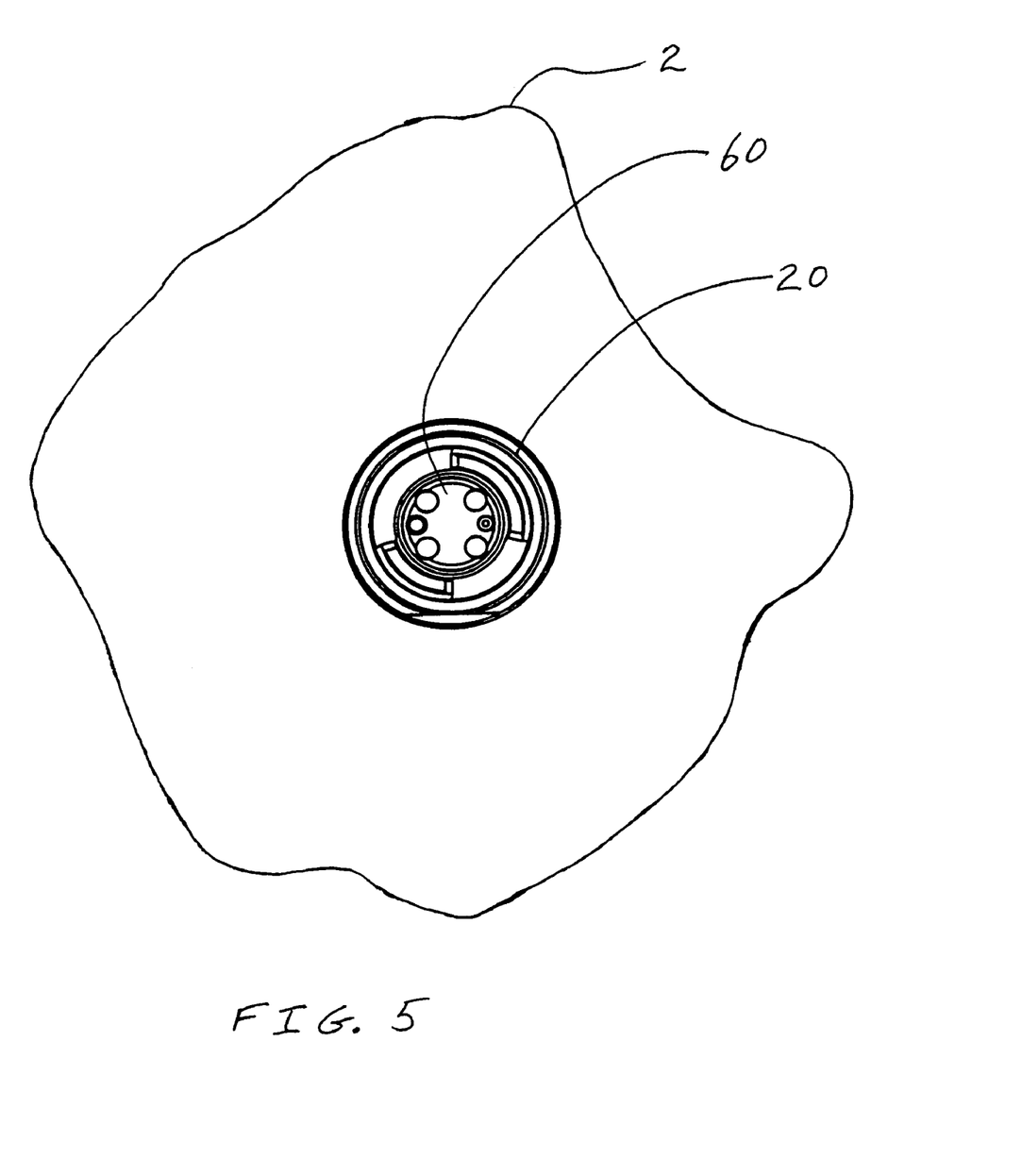
FIG. 5 is a plan view of the sleeve of the optoelectronic device of FIG. 1 inserted into the opening of the bulkhead of FIG. 5.

FIG. 5 is plan view of a portion of the sleeve 20 entering the opening 4 in the bulkhead 2. Also shown is the insert body 60.

Figure 6:
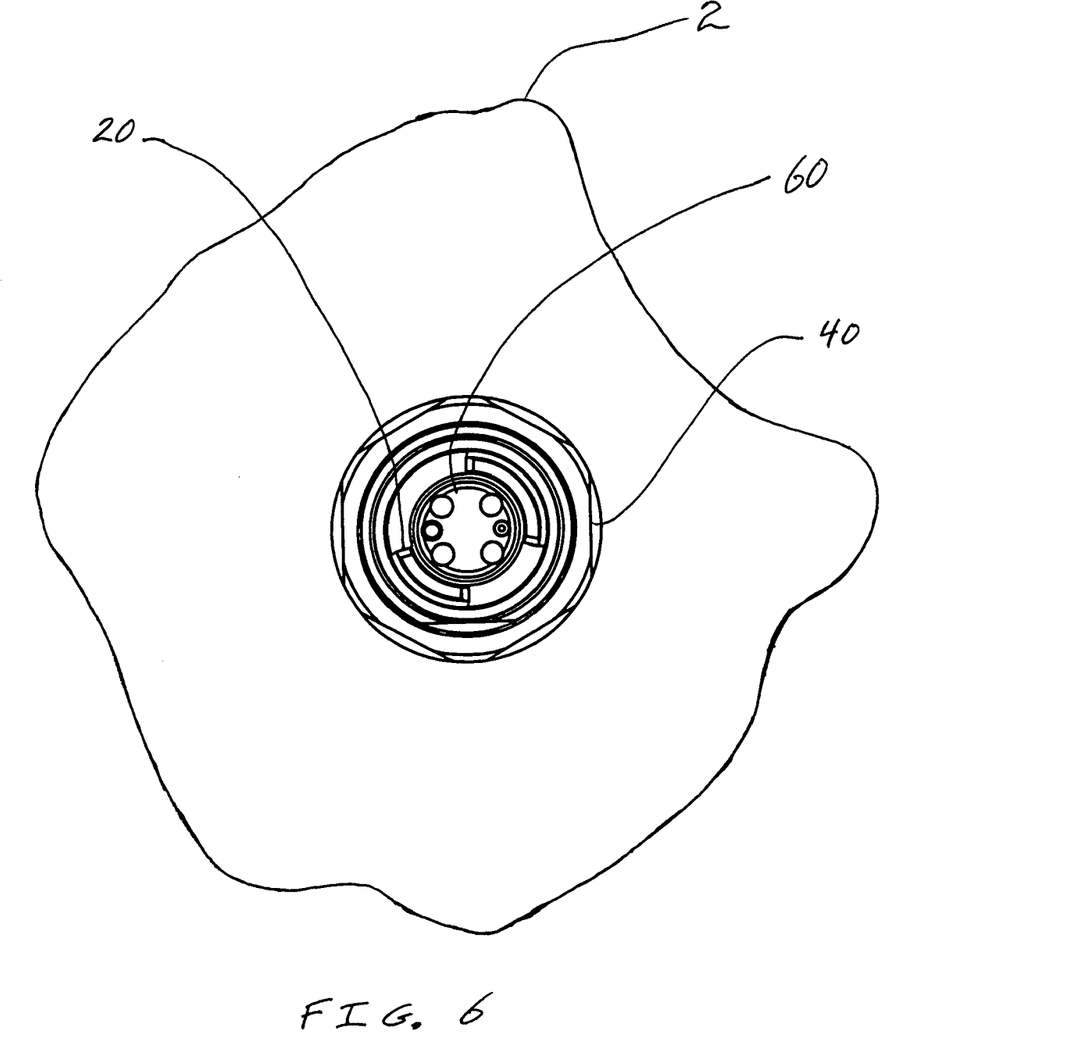
FIG. 6 is a plan view of the assembly of FIG. 5 with the addition of the panel nut mounted on the sleeve of the optoelectronic device of FIG. 1.

FIG. 6 is a plan view of the assembly of FIG. 5 having the panel nut 40 mounted to the sleeve 20.

Figure 7:
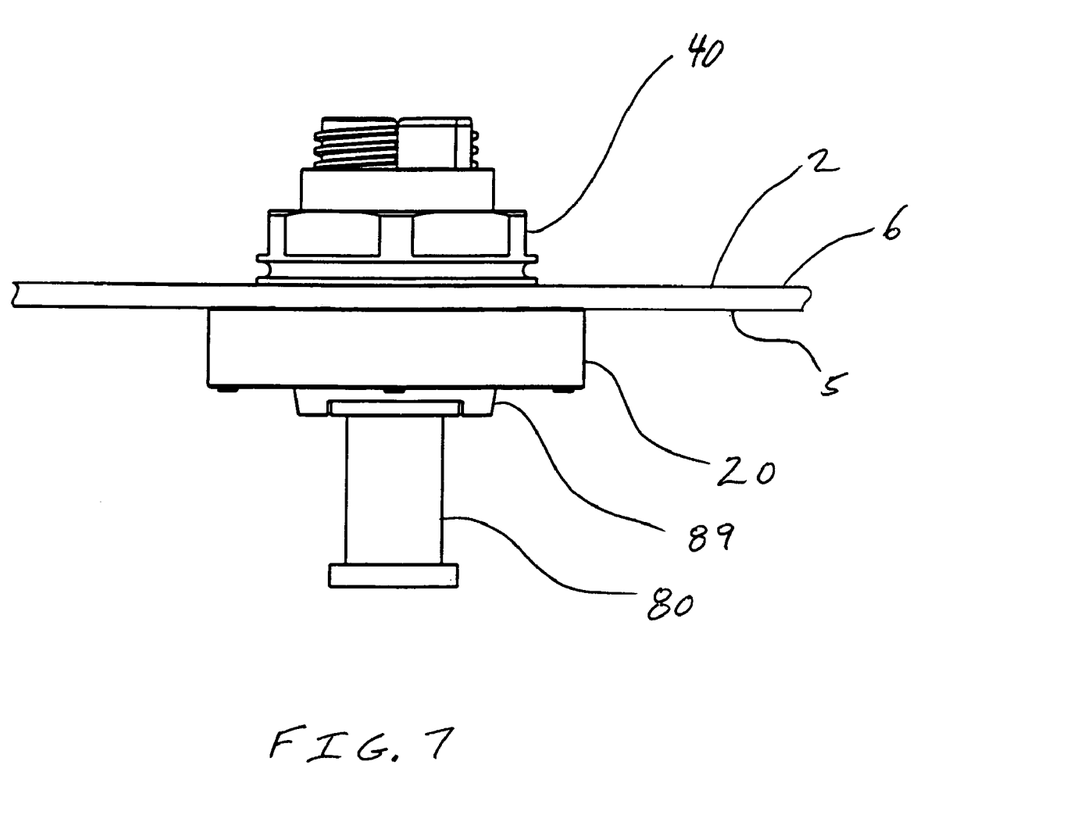
FIG. 7 is a side view of the assembly of FIG. 6 showing the panel nut and the sleeve straddling the bulkhead.

FIG. 7 is a side view of the assembly shown in FIG. 6. The bulkhead 2 has a first surface 5 and a second surface 6. Once the panel nut 40 is fully engaged with the threaded surface of the sleeve 20, the seating surface 42 of the panel nut 20 contacts the second surface 6 of the bulkhead 2, and the seating surface 22 of the sleeve 20 contacts the first surface 5 of the bulkhead 2. The closed loop force passing in compression through the seating surfaces 22, 42, and the bulkhead 2 circulate though the sleeve as a tensile force. The compressive force passed through the seating surfaces 22, 42 and the bulkhead 2 keeps the optoelectronic device 10 securely mounted to the bulkhead 2.

Figure 8:
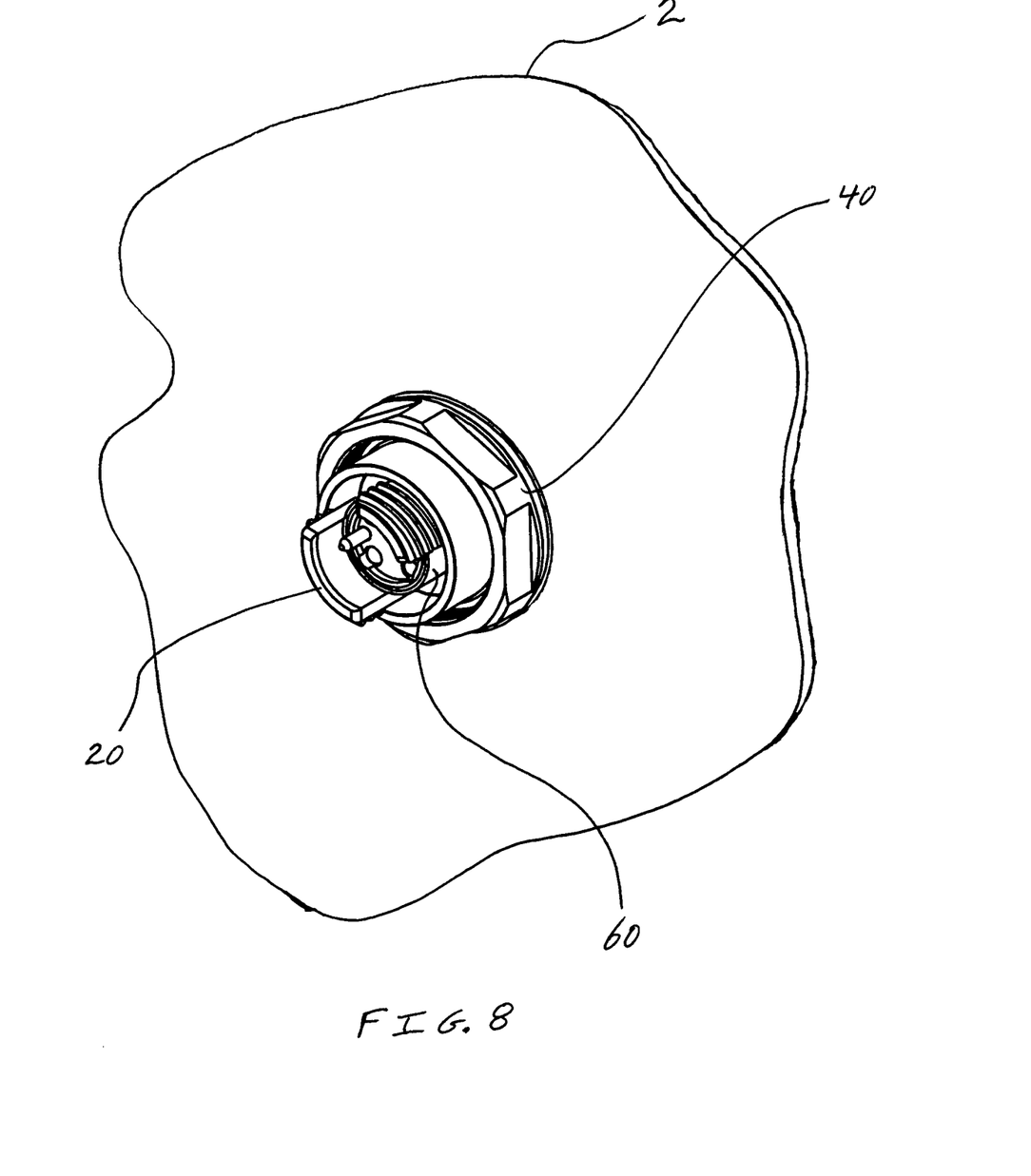
FIG. 8 is a perspective view of the assembly of FIG. 6.

FIG. 8 is a perspective view of the panel nut 40, the insert body 60, and the sleeve 20 of the optoelectronic device 10 mounted to the bulkhead 2.

Figure 9:
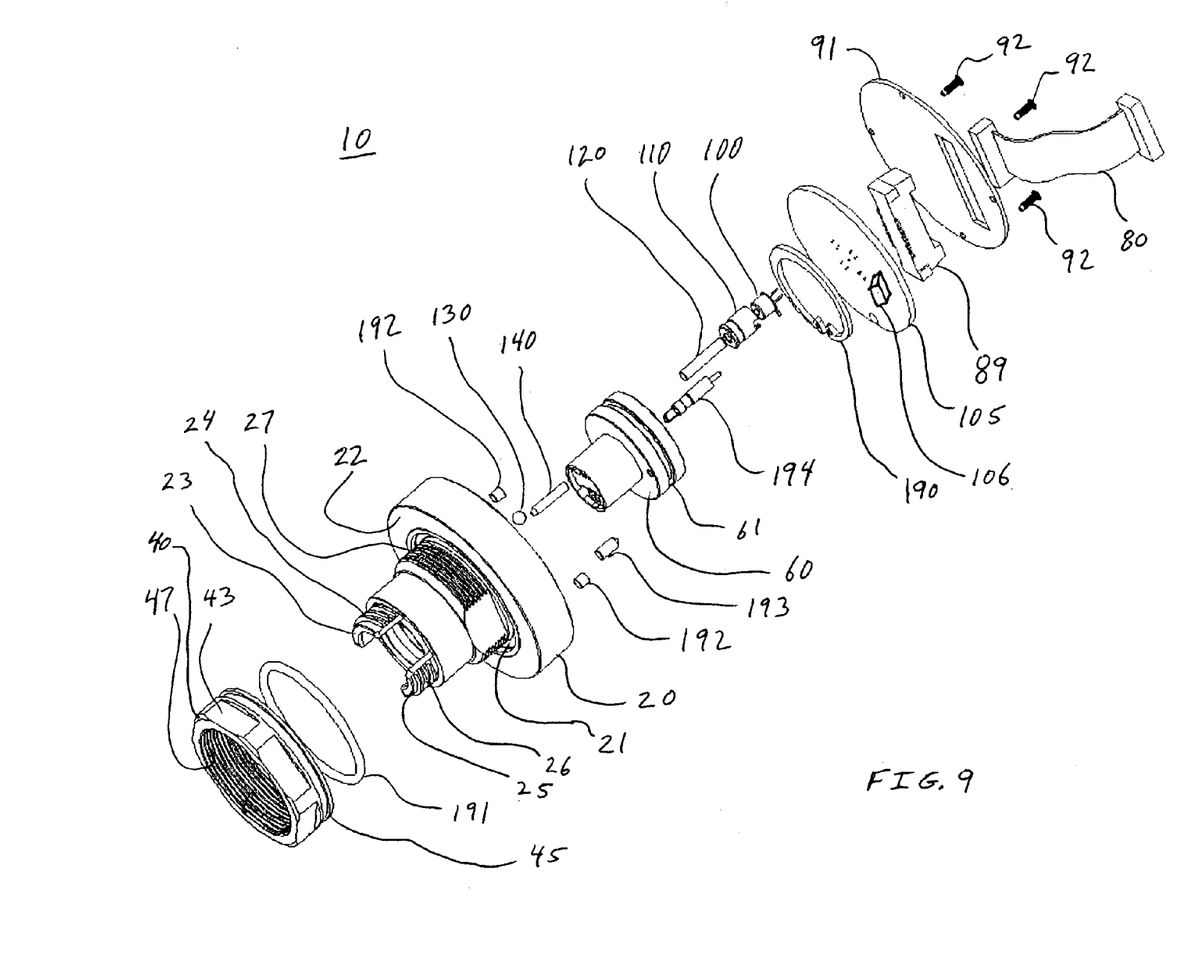
FIG. 9 is an exploded perspective view of the optoelectronic device of FIG. 1.

FIG. 9 is an exploded perspective view of the optoelectronic device 10. The insert body 60 has an O-ring groove 61. The O-ring groove 61 accepts an O-ring (not shown) so as to form a seal between the inside surface of the aperture 28 of the sleeve 20 and the insert body 60. The ferrule 120 is shown adjacent to the ferrule can 110 and the optical subassembly 100. The alignment pin 140 and the lens 130 fit into the insert body 60. The assembly of the insert body 60, alignment pin 140, lens 130, ferrule 120, ferrule can 110 and optical subassembly 100 are positioned in the aperture 28 of the sleeve 20 and retained in place by a retaining ring 190. The retaining ring is secured in a retaining ring groove 128 (see FIG. 10) of the sleeve 20 and also contacts the end surface of the insert body 60 so as to retain the insert body 60 within the aperture 28 of the sleeve 20. For reasons of clarity, only one lens 130, one ferrule can 110, one ferrule 120, and one optical subassembly 100 are shown in FIG. 9.

The electrical connector 89 is mounted on the substrate or printed circuit board 105. The substrate 105 contains electronic circuitry 106. Depending on the application, the electronic circuitry 105 can consist of resistors, capacitors, inductors, integrated circuits, and transistors. In the case where the optical subassembly 100 is a transmitting device, then the electronic circuitry 106 would also include a driver for the laser or light emitting diode contained within the optical subassembly. In the case where the optical subassembly 100 is a receiver, the electronic circuitry 106 would also include an amplifier to amplify the electrical signal provided by the photodiode in the optical subassembly 100. Furthermore, if the device 10 includes both transmitting and receiving optical subassemblies, then the electronic circuitry 106 contains at least one of both a driver and an amplifier.

The assembly of the substrate 105 and electrical connector 89 is placed in the sleeve 20 so that leads from the optical subassemblies 100 pass through openings in the substrate to facilitate the soldering of the leads to the substrate 105. To help support the substrate 105, stand offs 192 can be placed between the substrate 105 and a ledge in the sleeve 20. Furthermore, locating pins 193, 194 can be used to rotationally orient the insert body 60 relative to the substrate 105. The cover 91 is placed against the sleeve 20 and is held in place by threading four screws 92 into the sleeve 20 so as to trap the cover 91 against the sleeve 20. The ribbon cable 80 mounts to the electrical connector 89 so as to carry the electrical signals to and from another location.

The sleeve 20 has an O-ring groove 21 into which O-ring 191 is fitted. The O-ring ensures that when the seating surface 22 of the sleeve 20 contacts the surface of the bulkhead 2, the O-ring 191 also contacts the surface of the bulkhead 2 and deforms, thus making a seal. The sleeve 20 also has a first key 23 having a thread form 24 and a second key 25 having a thread form 26. The thread form 27 of the sleeve 20 is complimentary to the thread form 47 of the panel nut 40. The panel nut 40 has a lanyard groove 45 for the attachment of a lanyard. The panel nut 40 has flat regions 43 so as to facilitate the rotation of the panel nut 40 with a tool such as a wrench relative to the sleeve 20 when the panel nut 40 is being mounted onto the sleeve 20.

Figure 10:
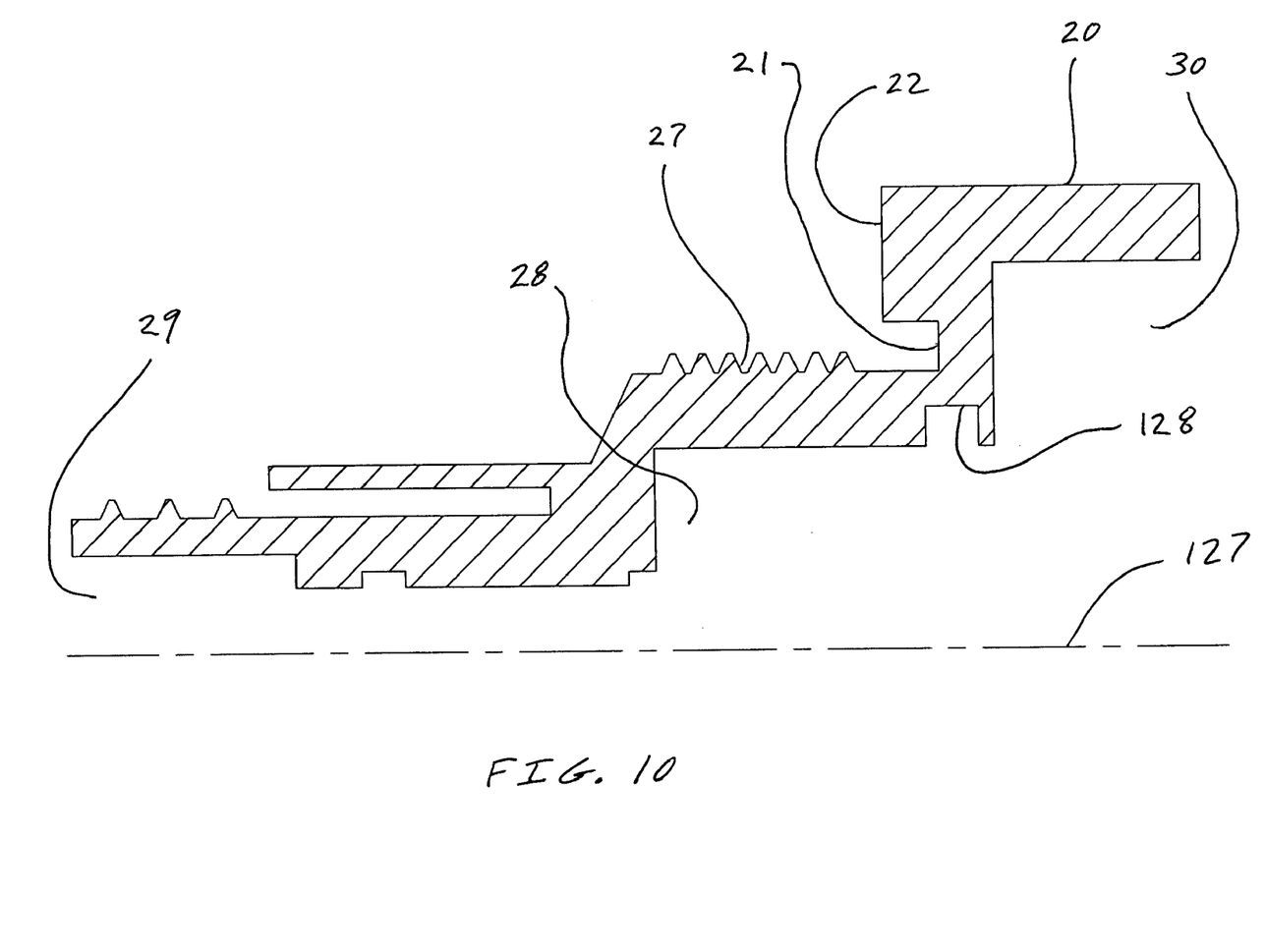
FIG. 10 is a quarter cross-sectional view of the sleeve of FIG. 1.

FIG. 10 is a partial cross-sectional view of the sleeve 20. One quarter of the sleeve 20 is shown along with the center line 127. Identified in FIG. 10 are the seating surface 22, and the aperture 28 of the sleeve 20. The aperture 28 has a first end 29 and a second end 30.

Figure 11:
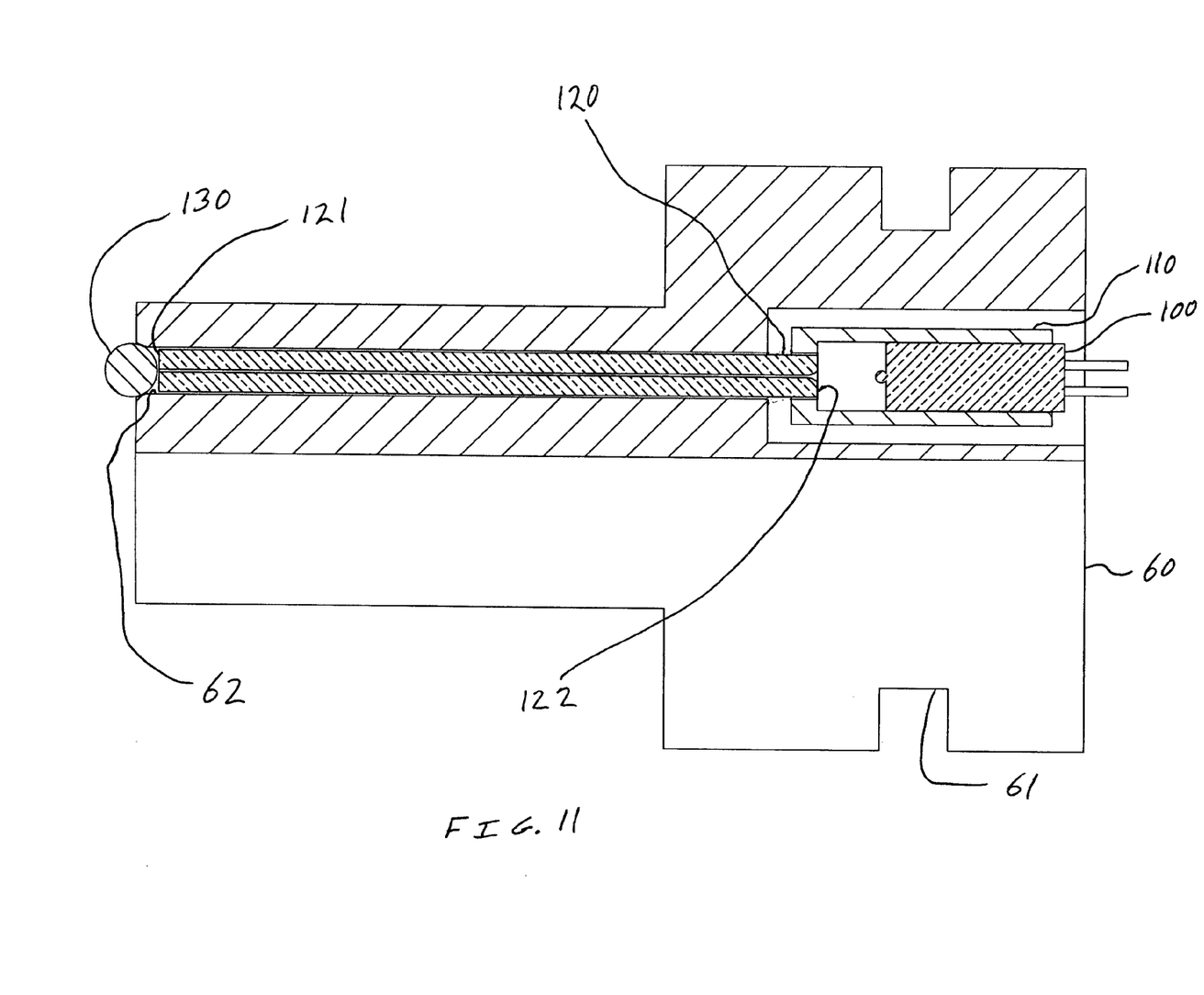
FIG. 11 is a quarter cross-sectional view of the insert body, ferrule, ball lens, ferrule can, and optical subassembly.

FIG. 11 is a partial cross-sectional view of the insert body 60, the lens 130, the ferrule 120, the ferrule can 110, and the optical subassembly 100. The insert body 60 has a ferrule receiving bore 62. The view shows one quarter of the assembly in cross-section and the remainder of the assembly is shown as a side view. Methods for retaining lenses and ferrules on or in bodies, such as the insert body, are well known in the art and are not further discussed. Additionally, methods of introducing a ferrule to a ferrule can and an optical subassembly to a ferrule can are well known in the art, as is the securing of the ferrule can to body, such as the insert body, and are not further discussed.

Once fully installed to the bulkhead 2, the optoelectronic device 10 is ready to have a mating optical connector (not shown) attached to the optoelectronic device 10, as shown on FIG. 8. The keys 23, 25 of the sleeve 20 help to orient the mating optical connector with the optoelectronic device 10. The mating optical connector has keys which are complementary with the keys 23, 25 of the optoelectronic device 10. The mating connector is secured to the optoelectronic device 10 by way of a securing nut (not shown) that has an internal thread form that is complementary to the thread forms 24, 26 of the respective keys 23, 25, as shown in FIG. 9.

As a further keying device, the optoelectronic device 10 utilizes an alignment pin 140, and an alignment pin hole 141, as shown in FIG. 2. When the mating optical connector approaches the optoelectronic device 10, the alignment pin 140 enters a corresponding alignment pin hole of the mating connector, and an alignment pin of the mating optical connector enters the alignment pin hole 141 of the optoelectronic device 10 so as to ensure the correct and precise orientation of the optical pathways formed in or retained in the mating optical connector with the respective lenses 130 of the optoelectric device 10. Such precise orientation of the mating optical connector with the optoelectric device 10 reduces optical power losses at the junction.

In practice, the four optical subassemblies of the optoelectronic device 10 could all be transmitting devices, or all four of the optical subassemblies could be receiving devices, or three of the optical subassemblies could be transmitting devices and the remaining optical subassembly would be a receiving device, or three of the optical subassemblies could be receiving devices and the remaining optical subassembly would be a transmitting device. In the most common combination, however, two of the optical subassemblies are transmitting devices, and two optical subassemblies are receiving devices. The four optical subassemblies described herein is but an example. In one form of the device, the optoelectronic device may have only one optical subassembly, and, in another form of the device, the optoelectronic device may have as many optical subassemblies as is practicable.

In the case of a receiving device, in operation, an expanded beam of light emanates from the mating optical connector onto and through the lens 130. The lens 130 focuses the light on a first end 121 of the ferrule 120. The light propagates through the ferrule 120 and exits the ferrule 120 at a second end 122 of the ferrule 120. Upon exiting the ferrule 120, the light is introduced into the ferrule can 110. The light travels through the evacuated portion of the ferrule can 110 so as to shine on the optical subassembly 100. The light shining on the optical subassembly 100 enters the optical subassembly and strikes the active optical element, in this case a receiving device. The receiving device transforms the light energy into an electrical signal. The electrical signal is transmitted through the leads of the optical subassembly 110, onto conductive traces on the substrate 105. The electrical signal then enters the electrical circuitry 106 on the substrate 105, and in the case of a receiving device, the electrical circuitry 106 includes an amplifier to amplify the electrical signal. The amplified electrical signal then flows into the electrical connector 89 and into the ribbon cable 80 so that it can be transmitted to another location. Furthermore, power supplied to the amplifier is supplied through the ribbon cable 80 to the optoelectronic device 10 from a remote location.

In the case of a transmitting device, in operation, an electrical signal is introduced into the ribbon cable 80, which flows into and through the electrical connector 89. The electrical signal flows out of the electrical connector 89 and onto electrical traces formed on the substrate 105. The electrical signal is then introduced into the electrical circuitry 106 on the substarte 105, and in the case of a transmitting device, the electrical circuitry 106 includes driver circuitry so that the laser or light emitting diode of the transmitting device is properly powered and controlled. The altered electrical signal exits the electrical circuitry 106 and flows through conductive traces formed on the substrate 105. The altered electrical signal flows from the conductive traces to the leads of the optical subassembly 100 and the altered electrical signal is then introduced to the active transmitting device. The transmitting device transforms the electrical signal to an optical or light signal. The light signal exits the optical subassembly 100, travels through the open space of the ferrule can 110, and is introduced into the second end 122 of the ferrule 120. The light signal travels through the ferrule 120 and exits its first end 121. The light signal then passe though the lens 130. The lens 130 expands the light into columnated light. The light then, already exited the optoelectronic device 10, enters the mating optical connector for transmission to a remote location.

The components of the optoelectronic device 10 are constructed of typical engineering materials. Typically, the sleeve 20, the insert body 60, the panel nut 40, the retaining ring, the ferrule can 110, the alignment pin 140, screws 92, and the cover 91 are constructed of metallic materials. Typically, the lens 130 is made of an optically transparent material such as glass or sapphire. The ferrule 120 is typically made of a ceramic material or of a polymer material. The O-ring 191 is preferably made of an elastomeric material. The printed circuit board 105 is typically made of non-electrically conductive material, such as FR4, upon which conductive traces are laid. The electrical connector 89 and the ribbon cable 80 are preferably constructed of metallic conductive traces surrounded by insulative polymeric materials.

As compared to known assemblies, the optoelectronic device 10 has eliminated the separate mounting of a transceiver, and the use of fiber optic patch cords to attach an optical bulkhead connector to a remotely mounted transceiver. Thus, the optoelectronic device 10 eliminates optical power losses experienced at numerous junction since the extra junctions do no exist with the use of the optoelectronic device 10, eliminates weight since the part count is lowered as compared to the known solutions, increases reliability since the part count is lowered as compared to the known solutions, and increases space since the part count is lowered as compared to the known solutions.

Obviously, numerous modifications and variations of the present invention are possible in light of the above teachings. It is therefore to be understood that within the scope of appended claims, the invention may be practiced otherwise than as specifically described herein.

The invention claimed is:

1. A device mountable to a bulkhead, the device comprising:
   a sleeve having a seating surface;
   an optical subassembly;
   an electrical connector;
   a substrate attached to the optical subassembly and to the electrical connector, the substrate having electrical signal conditioning components mounted thereon, the electrical signal conditioning components electrically connect the optical subassembly to the electrical connector, and wherein the substrate is mounted to the sleeve; and
   a panel nut having a seating surface, and wherein the panel nut is removeably mountable on the sleeve, and wherein, in a mounted position of the device, the panel nut is mounted on the sleeve so that the seating surface of the panel nut contacts a first surface of the bulkhead and the seating surface of the sleeve contacts a second surface of the bulkhead so that the device is securely mounted to the bulkhead.

2. A device according to claim 1 wherein the sleeve includes a thread form.

3. A device according to claim 2 wherein the panel nut includes a thread form, and wherein the thread form of the panel nut is complementary to the thread form of the sleeve.

4. A device according to claim 3 wherein the sleeve is made of a metallic material.

5. A device according to claim 4 wherein the panel nut includes a lanyard groove.

6. A device according to claim 5, further comprising a ribbon cable attached to the electrical connector.

7. A device according to claim 6 wherein the optical subassembly is a transmitting device.

8. A device according to claim 6 wherein the optical subassembly is a receiving device.

* * * * *